(12) United States Patent
Elftmann, Jr.

(10) Patent No.: US 10,334,838 B2
(45) Date of Patent: Jul. 2, 2019

(54) DEADFALL TRAP APPARATUS AND METHOD

(71) Applicant: Arthur J. Elftmann, Jr., Glendale, AZ (US)

(72) Inventor: Arthur J. Elftmann, Jr., Glendale, AZ (US)

( * ) Notice: Subject to any disclaimer, the term of this patent is extended or adjusted under 35 U.S.C. 154(b) by 199 days.

(21) Appl. No.: 15/374,832

(22) Filed: Dec. 9, 2016

(65) Prior Publication Data

US 2018/0160674 A1    Jun. 14, 2018

(51) Int. Cl.
*A01M 23/00* (2006.01)
*A01M 27/00* (2006.01)

(52) U.S. Cl.
CPC ............ *A01M 23/00* (2013.01); *A01M 27/00* (2013.01)

(58) Field of Classification Search
CPC ...... A01M 23/00; A01M 23/20; A01M 23/22; A01M 27/00
USPC .............................. 43/61, 62, 69, 70, 77, 78
See application file for complete search history.

(56) References Cited

U.S. PATENT DOCUMENTS

| | | | | |
|---|---|---|---|---|
| 109,112 A * | 11/1870 | Cosolowsky | ......... | A01M 23/24 43/78 |
| 613,916 A * | 11/1898 | Weeden | ................ | A01M 23/24 43/78 |
| 1,088,477 A * | 2/1914 | De St. Legier | ....... | A01M 23/22 43/62 |
| 1,641,062 A * | 8/1927 | St John Bacon | ..... | A01M 23/00 43/78 |
| 1,920,695 A * | 8/1933 | Hass | ..................... | A01M 27/00 43/84 |
| 1,937,260 A * | 11/1933 | Young | ................... | A01M 23/00 43/61 |
| 4,117,620 A * | 10/1978 | Stauffer | ................. | G05G 17/00 43/77 |
| 4,763,439 A * | 8/1988 | Smith | ................... | A01M 23/20 43/61 |
| 6,539,663 B2 * | 4/2003 | Mosher | ................. | A01M 23/22 43/58 |
| 6,543,179 B1 * | 4/2003 | Lee | ....................... | A01M 23/20 43/60 |

* cited by examiner

*Primary Examiner* — Lisa L Tsang
(74) *Attorney, Agent, or Firm* — Douglas W. Rudy

(57) ABSTRACT

A deadfall device for capturing targeted animals. In one embodiment the device is a bidirectional trigger manually set survival tool that can be selectively used to capture or crush a small animal. When not set up to capture an animal the device is compact and easily transportable. When not being used an elongated body of the device, comprised of two walls separated by a connected web, will house the movable elements of the device inside the elongated body. This allows the device to be stored compactly thus enabling ease of transportation.

13 Claims, 3 Drawing Sheets

DEADFALL TRAP APPARATUS AND METHOD

BACKGROUND OF THE INVENTION

Field of the Invention

This invention is a deadfall trap apparatus. It is configured as a convenient, lightweight, easily transportable device. It is used to either capture an animal or, alternatively, to kill an animal for survival sustenance when a person finds it necessary for his or her survival. It may also be used as a deadfall trap to capture an animal not intended to be used exclusively for survival.

Description of Known Art

Deadfall traps have been used for centuries. Trappers and sustenance providers used deadfall traps to trap animals in the wild without intense intervention from the hunter. Multiple traps would be baited and set simultaneously and the trapper would leave the traps unattended. The intent of deadfall traps is to kill the animal attracted to a baited trap to provide a source of sustenance and protein for the trapper. Un-baited deadfall traps, when the prey simply trips a trigger on the deadfall trap, are also functional. Often such traps can be placed on a wildlife path, proximate a burrow, or in another high traffic location.

There are several types of deadfall traps. The most common are the "figure-four" designs and the Paiute design.

The "figure-four" deadfall is simple but requires a good level of skill and experience to construct. It is made from several sticks with notches cut into them supporting a heavy rock or other heavy object that is released on the unsuspecting target animal and quickly terminates the animal.

Native Americans used the Paiute design. It is simple and effective. It is thought to be easier to set then the "figure-four" trap. Like the "figure-four" the Paiute deadfall trap also uses several sticks in its construction. It will have three long sticks, and a short trigger stick, along with a cord as parts of the apparatus. The Paiute trap is also whittled to provide balance and fulcrum points. The Paiute trap differs from the "figure-four" in that it uses the short string as an element of the trigger to actuate the deadfall trap.

Both of these deadfall trap embodiments require some whittling expertise, know-how, and experience to make a functionally efficient deadfall trap. The invention presented here doesn't require operator experience. The set-up of this deadfall trap is quick, easy and doesn't require a user to spend time in whittling several notches in several sticks as is needed in the Paiute or "figure-four" deadfall traps.

One operative part of a deadfall trap is a heavy rock, log, or weighty board (or a board with a weight on it) that is tilted on an angle and held up with sections of branches (sticks), with one of them serving as a trigger. When the target moves the trigger, which may have bait on or near it, the rock, log, or weighty board falls, crushing the target. The rock, log, or weighty board must be at least five times heavier than the animal that is to be caught. For example, if the target animal is a three-pound rabbit, the log must be at least fifteen pounds. Usually the log is set a foot to two feet above the ground on a thirty-degree angle. The log is held up with strong branches. Once the animal dislodges the trigger in searching for the bait, the log falls, crushing the animal.

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicants will amend the specification to expressly recite the essential material that is incorporated by reference as allowed by the applicable rules.

BRIEF SUMMARY OF THE INVENTION

The present invention provides a deadfall animal trap that is convenient, efficient and suitable as a sustenance and protein providing survivability tool. It is a compactly packaged apparatus that is light, sturdy, easy to use and effective. It requires no special skills or outdoor/woodsman/survival skills to set up and use.

An advantage of this deadfall trap is that it is a self-contained efficient non-lethal animal capturing tool when provided with a catch box that will fall on an animal and "live-trap" the targeted animal.

Another advantage of this deadfall trap is that when set with a significantly heavy load, such as a relatively flat rock, a tree branch, or a heavy or "weighty" board, gleaned from the surrounding environment, the deadfall trap is an efficient tool for providing animal protein in a survival situation.

Another advantage of this invention that distinguishes it from the prior art is that after being tripped it will not fall or land under the flat stone or board designed to crush the target. In some deadfall devices the sticks making up the device end up under the flat stone or board and the animal may have space to escape or may be inhumanly suffer if it is alive and injured.

Another object of the invention is that the device presented here is made mostly of aluminum and thus is not subject to rust or oxidation of the sliding surfaces of the trigger element.

Furthermore, the device is a very compact device when folded for transport and storage. In a preferred embodiment the device is packaged in a slim cylindrical tube that is easily stored in a backpack or the like.

Another advantage of the invention is that it is easy to set up and easy to store.

The tool provided in this disclosure is designed for use as a survival tool. It is not intended to be used in a residential environment, as a conventional mousetrap would be. Deadfall traps are deadly and it would be unfortunate if a family pet were inadvertently impacted by this or any other deadfall trap. In a survival situation, in the brush, it would be unusual to encounter a family pet. Again, this is a tool designed for use as a survival tool.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for," and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE DRAWINGS

A more complete understanding of the present invention may be derived by referring to the drawings in which.

Elements and acts depicted in the figure are illustrated for simplicity. They are presented to illustrate the invention to assist in an understanding thereof. The figure is not necessarily been rendered according to any particular sequence, size, scale or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the invention is not limited to the examples that are described below.

Figure 1:
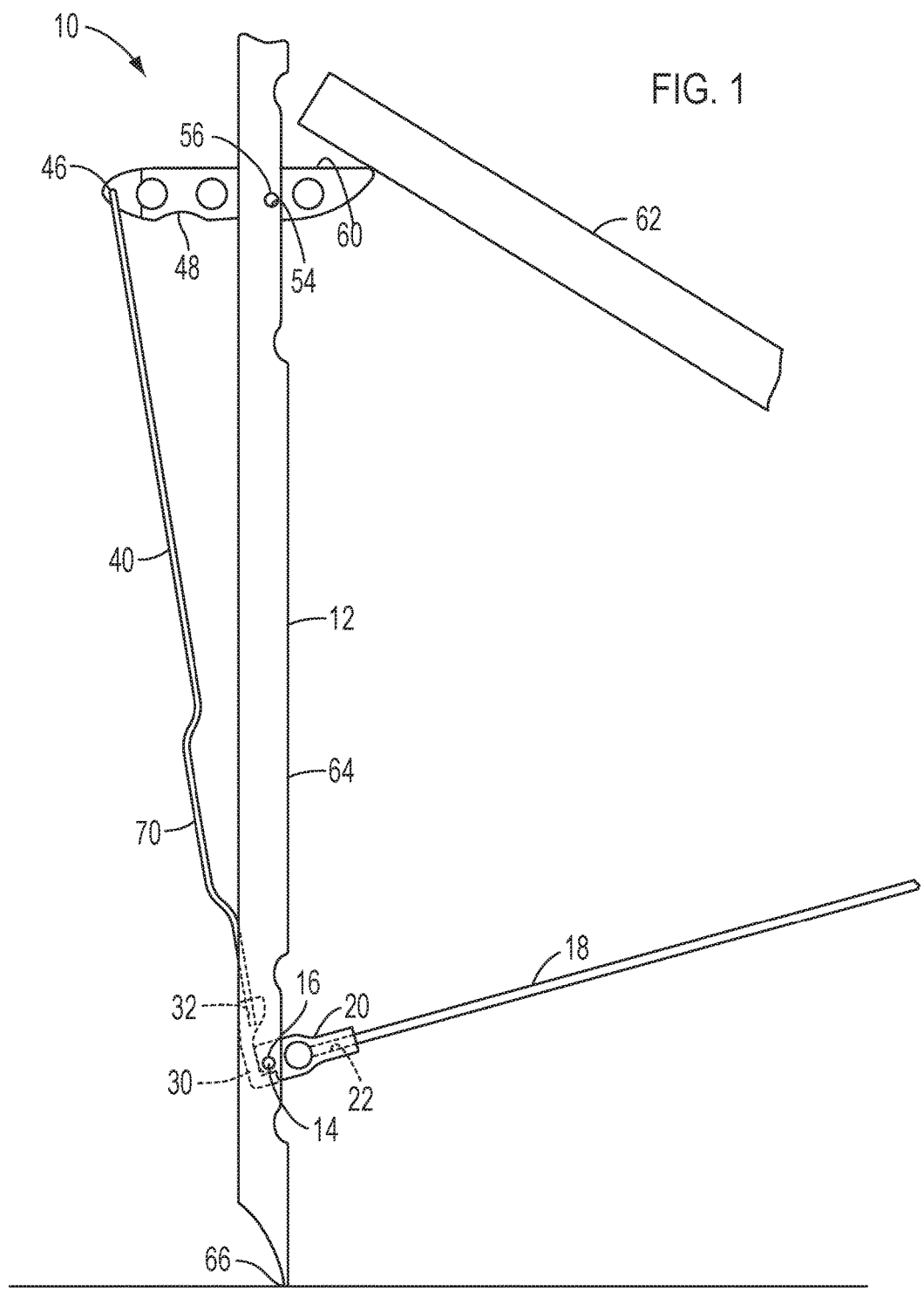
FIG. 1 is a side elevation view depicting of the deadfall apparatus, in conjunction with a weighted board, in a set configuration ready to be triggered by an animal.

Turning first to FIG. 1, the deadfall apparatus, sometimes hereinafter referred to as the "trap," is shown generally as item 10. The device is shown in a deployed mode ready to be triggered, tripped, or sprung to trap an animal. The body 12 of the device is preferably an aluminum channel having a width and a depth of about a half an inch. In this embodiment the body of the device is about twelve inches long from end to end.

Item 62 in FIG. 1 is an impact/capture element. In one embodiment, where the user intends to crush a target, usually in a survival situation, the impact/capture element will be a weighted board (a board is shown in FIG. 1), a large stone or a log, preferably having a generally flat lower surface. It is known that the weight of the impact element, when intended to kill the target, should be five times the weight of the target animal. Thus if the target animal is a squirrel weighing about a pound the impact element should weigh around five pounds. The impact/capture element 62 is positioned on the trap such that the impact/capture element forms an angle with the ground of between about fifteen to seventy-five degrees. The angle could be greater or less but needs to allow the impact/capture element to accelerate enough to provide the force necessary to crush the targeted animal. ("Crush" is used to mean that the animal is compressed to the point where breathing ceases.)

When the user's intent is to capture an animal, rather then crushing it, a capture element, such as a cage or a box will take the place of the weighted board or slab. One edge of the box will be positioned on the trap. When sprung or tripped the target will be contained in the cage or box.

The general effect and use of a deadfall trap is well known. The concept behind the deadfall as a survival tool is one of the basic survival techniques used. It is not the concept of a deadfall trap that is the invention here; rather it is the embodiment of the unique deadfall trap shown in the drawing figures that is the invention.

Figure 5:
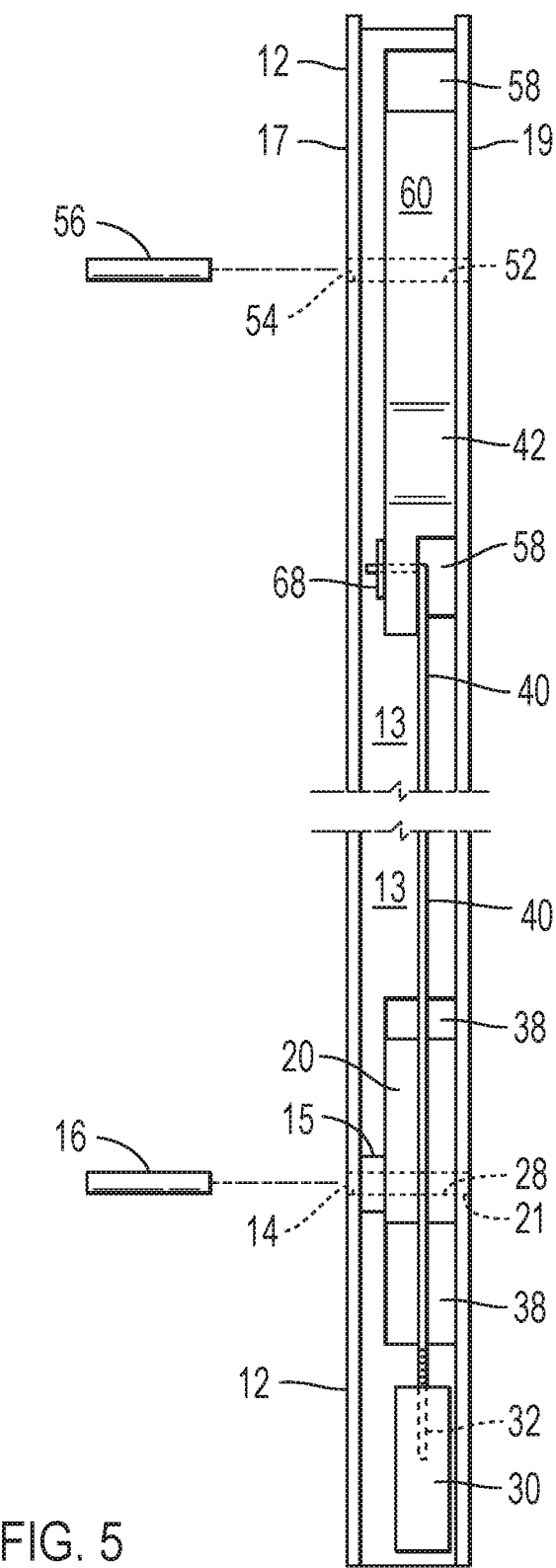
FIG. 5 is a view of the body of the device showing the parts that are carried in the device.

Continuing to look at FIG. 1, the body 12, the aluminum channel section (in a preferred embodiment it is an extruded aluminum piece, but it need not be aluminum, other metals, plastics, wood, or other appropriate material could also be used) has a trigger pivot point through aperture 14 formed near the lower part of the body 12. A load support pivot point aperture 54 is a through bore near the upper part of the body 12. Each sidewall, sidewalls are items 17 and 19 and they are connected to each other by a web 13, as shown in FIG. 5, of the channel making up the body has openings machined in the sidewalls in the vicinity of the pivot point apertures at the top and the bottom of the body as shown in FIG. 1.

Figure 2:
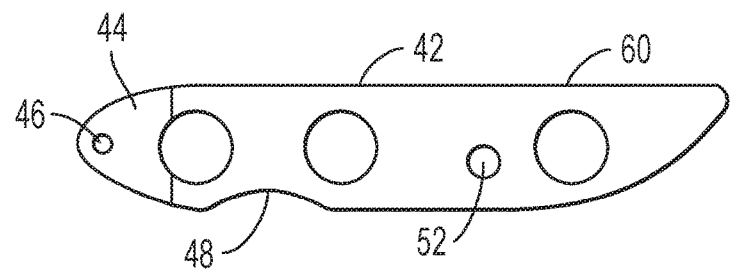
FIG. 2 is an elevation view of the pivotable load support element of the device.
Figure 3:
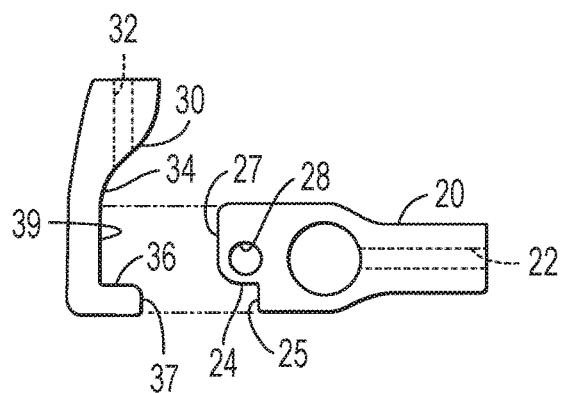
FIG. 3 is a side elevation presentation of the two parts of the trigger device with one part spaced away from the second part to show the fact that the two parts are not connected together unless the trigger is set to operate.
Figure 4:
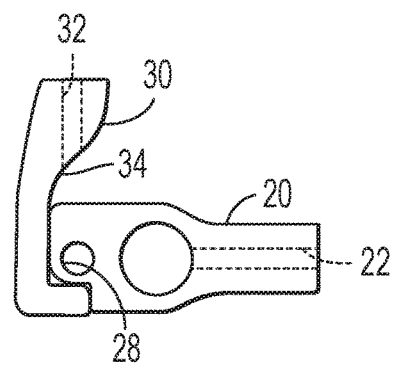
FIG. 4 is a side elevation view of the two parts of the trigger device as shown in FIG. 3 with the two parts connected together as when the trigger is set to operate.

FIGS. 2-4 show three pieces of the device removed from the assembly shown in FIG. 1.

FIG. 2 is a side elevation view of the pivotal load support 42 the pivotable load support 42. When installed in the body 12 and positioned on load support pivot pin 56, which may be a press fit into the load support pivot point aperture 52, and a sliding fit in the load support pivot point apertures, one on each channel wall of the body 12, the pivot load support 42 can freely swing into the set position shown in FIG. 1 or into the cavity or opening formed by the channel body 12. The pivotable load support 42 pivotable load support 42 also includes a relieve shelf 44. This shelf is about one-third to one-half the thickness of the main body portion of the pivotable load support 42. A linkage attachment point, here it is an aperture 46, is provided through the shelf 44 and will accommodate the bent over end of the linkage rod 40 as best seen in FIGS. 1 and 5. In FIG. 2, the relative top margin 60 of the pivotable load support 42, in the area to the relative right of the load support pivot point aperture 52, is the zone or area that a slab, weighty board, log, tree branch or the like will be supported when the device is set in the field. See FIG. 1.

A relief or finger (or thumb) stabilizer indentation 48 is provided in the lower margin of the pivotable load support 42.

FIGS. 3 and 4 are side elevation views of the actual trigger mechanism.

FIG. 3 shows the pivoting trigger release 20 spaced apart from the releasable trigger element 30. In FIG. 4 the pivoting trigger release 20 and the releasable trigger element 30 are in contact with each other as they would be when the device is set as shown in FIG. 1.

In FIGS. 3 and 4 the pivoting trigger release 20 has a trigger extension-receiving aperture 22. It is a hole drilled in the body of the trigger release and is provided to accept a trigger extension or trip stick 18 as shown in FIG. 1. A trigger pivot point pin-receiving aperture 28 is a through bore in the trigger release 20. It will accommodate, in a press fit manner, the trigger pivot point pin 16. An important element of the pivoting trigger release 20 is the first contact surface 24. This surface 24 will be in contact with the second contact surface 36 of the releasable trigger element 30 as explained below.

In FIGS. 3 and 4 the releasable trigger element 30 is shown in contact with the pivoting trigger release 20 (FIG. 4) and spaced apart (FIG. 3). A linkage rod-receiving aperture 32 is a threaded hole to accommodate the linkage rod 40 (See FIG. 1).

This trigger assembly is a two-way trigger. It can be tripped or sprung by virtually any contact between an animal and the trip stick 18 (trigger extension).

A second contact surface 36 will contact the first contact service 24 of the pivoting trigger release 20 when the trap is set as shown in FIG. 1. A trigger element valley 34 is formed in the releasable trigger element 30. This valley 34 accommodates the end of the pivoting trigger release.

In a first triggering scenario when the pivoting trigger release is urged downwardly by an animal stepping on the trip stick 18, for instance, the trigger release will rotate relatively clockwise (FIGS. 3 and 4) and the contact between surfaces 36 and 24 will be broken. The downwardly extending portion 25 of the pivoting trigger release 20 will push against the first adjacent surface 37 of the releasable trigger element 30. Thus the releasable trigger element will be free from the trigger release and the trap will impact the target animal.

Similarly, in a second triggering scenario, when the pivoting trigger release is urged upwardly by an animal pushing up on the trip stick 18 with part of his body the trigger release will rotate relatively counter-clockwise (FIGS. 3 and 4) and the contact between surfaces 36 and 24 will be broken. The upwardly extending portion 27 of the pivoting trigger release 20 will push against the second adjacent surface 39 of the releasable trigger element 30. Thus the releasable trigger element will be free from the trigger release and the trap will spring down.

The trap will be triggered if the trip stick is pushed up or pushed down by the animal. It is also contemplated and observed, that even slight contact between an animal on the trip stick in any direction, not limited to up or down, will trip the trap as the sensitivity of the device is very high.

FIG. 5 is a view of the assembled unit from the open side of the channel or body 12. In this view the device is in a transport configuration, rather than in a set position as shown in FIG. 1. The deadfall apparatus is a very compact unit when in the storage or transport mode shown in FIG. 5.

In FIG. 5, starting from the bottom of the assembly, the body 12 surrounds the releasable trigger element 30 connected to the linkage rod 40. The linkage rod 40 includes a "kink" or offset portion of the rod to allow the linkage rod 40 to stored inside the channel and allow nesting adjacent to pivoting trigger release 20 when the pivoting trigger release is stored in the channel when the apparatus is in the transport mode. The next element from the bottom in FIG. 5 is the linkage rod-receiving aperture 32 which is pivotally supported on trigger pivot point pin 16. This pivot point pin passed through holes, one shown as 14, in both channel walls, through a spacer 15, into the trigger pivot point pin receiving aperture 28 and finally through the aperture (same as aperture 14 but in the opposing channel wall). A first rectangular slot 38 is formed in the web 13 of the body 12, the web 13 being the surface between the two sidewalls 17 and 19, of the body 12. This slot 38 is long enough to allow the pivoting trigger release 20 to rotate through an arc of about three hundred and fifty degrees with the web preventing the trigger release from rotating a full three hundred and sixty degrees. The trigger release can rotate from the stored position to a set position on the relative backside of the channel web.

Following the linkage rod 40 upwardly in FIG. 5 the linkage rod 40 is shown connected through the linkage attachment point aperture 46 (FIGS. 1 and 2) and retained in place using a retainer clip 68. Item 42, the pivotable load support, is rotatably carried by load support pivot point pin 56. This load support pivot point pin passes through holes, one shown as 54, in each channel wall into the load support pivot pin aperture 52 and finally through the aperture (same as aperture 54 but in the opposing channel wall).

In an alternative embodiment an optional spacer may be positioned inboard of the channel wall adjacent the left side (in FIG. 5) of the load support 42.

A second rectangular slot 58 is formed in the web 13, the surface between the two sidewalls 17 and 19, of the body 12. This slot 58 is long enough to allow the pivotable load support 42 to rotate through an arc of less than one hundred eighty degrees with the web preventing the load support 42 from rotating a full three hundred sixty degrees. The load support 42 can rotate from the stored position to a set position on the relative backside of the channel web.

The operation or setting of the deadfall apparatus is simple after initially learning how to set the trap.

The first step is to insert a trigger extension or trip stick 18 into the trigger extension-receiving aperture 22 of the pivoting trigger release 20. In a survival situation and where the trip stick shipped with the device is lost, a twig can be used as trip stick. As shown in FIG. 1 the trigger release 20 will extend out of the first rectangular slot 38. With the device held vertically and with the lower part of the body 12 in contact with the ground, the pivotable load support 42 is held horizontally relative to the body 12. This is done by using a thumb on the top end of the body 12 and the user's finger interfacing with finger stabilizer 48 of the pivotable load support. The rod 40 is moved toward the body 12 such that the releasable trigger element 30 is contacting the pivoting trigger release 20. Specifically the first contact surface 24 of the pivoting trigger release 20 is in full contact with the second contact surface 36 of the releaseable trigger element 30. With these two trigger elements firmly contacting each other the significantly weighty board or flat rock, for instance, is positioned on the capture element-receiving surface 60 of the pivotable load support. FIG. 1 shows the device set with a weighty board and ready for use.

What happens next is the capture phase. If it is intended that the target animal be captured alive a box or other container will be used instead of the weighty board or flat rock.

If, in a survival situation where an animal will be terminated, a quick demise of the animal is desireable. In such a situation a target animal, such as a mouse, rat, rabbit, or other small animal, will contact the trip stick and the device will release the heavy board, flat rock, log, tree branch, or the like and crush the animal. Even slight contact with the trip stick will cause the pivoting trigger release 20 to disengage from the releaseable trigger element 30 and the weight of the board or rock will rotate the pivotable load support 42 releasing the crushing board or rock.

It is the intent of the inventor that the device presented here can be scaled up for use in catching larger animals. The length of the body portion, in a preferred embodiment for small animals is about a foot long, would be extended, as would the linkage rod. The trigger element and the load support could remain the same size as in the preferred embodiment when the device is scaled up.

Another alternative embodiment is one in which the channel section body portion is a simple beam or perhaps a simple "I-beam." In this configuration the trigger elements, items 20 and 30, and the pivotable load support 42, would have slots machined in them to accommodate the simple beam. Pivot pins would be carried in first and second apertures on the trigger elements and the pivotable load support and extend from one side of the provided slots through appropriate placed apertures the simple beam. The pivot pins would then each pass into an aperture on the opposite slot wall of the trigger elements and the pivotable load support.

Another embodiment of the invention is that the channel section beam is replaced with a simple beam as disclosed above but this embodiment there is no need to form slots in the trigger elements or the pivotable load support. In this embodiment the trigger elements and the load support will be carried on one side of the beam. The pivot pins for the pivoting trigger release 20 and the load support 30 will be fixed into the simple beam and the trigger release and load support will be cantilevered on their respective pivot pins.

A refinement of the simple beam disclosed in the alternative embodiments above is to have the simple beam being a shallow channel section beam with the sidewalls of the channel being provided for strength. Where the simple beam, here a shallow channel section beam, is used wherein the trigger release and load support are cantilevered on the beam it would be preferred that the trigger release and the load support are located adjacent the back side of the web so that the short sidewalls of the channel face away from the trigger release and the load support. This is preferred but not required.

The invention presented is a deadfall trap apparatus useful in a survival situation allowing capture of an animal for survival, either as a source of protein or as bait for fishing or catching another animal. The device comprises a body portion, the body portion comprising a channel having first and second spaced apart walls connected by a web, a trigger pivot point aperture extending on the same axis through both walls of the body and a load support pivot point aperture extending on the same axis through both walls of the body. It also comprises a pivoting trigger release further comprising a trigger pivot point pin pivotally carried in the trigger pivot point aperture on the spaced apart walls of the body, and, when the trap is set. That is, there is a releasable trigger element in contact with the pivoting trigger release when the deadfall trap apparatus is set and the releasable trigger element is not in contact with the pivoting trigger release when the deadfall trap is tripped. The device further comprises a pivotable load support comprising a load support pivot point pin pivotally carried in the load support pivot point apertures formed in the spaced apart walls of the body of the deadfall trap apparatus. Tying the trigger elements and the pivotable load support together when the trap is set is a linkage rod connecting the releasable trigger element to a linkage attachment point at one end of the pivotable load support.

A refinement of the invention comprises first and second slots formed in the web of the body, the first slot adjacent the trigger pivot point aperture in the walls of the body and the second slot adjacent the load support pivot point apertures in the walls of the body. Furthermore, the pivoting trigger release may pivot on the trigger pivot point pin through the first slot in an arc of less then three hundred sixty degrees until the pivoting trigger release contacts the web of the body.

The pivotable load support mentioned above may pivot on the load support pivot pin through the second slot in an arc of less then three hundred sixty degrees until the pivotable load support contacts the web of the body. This pivoting trigger release comprises a trigger extension-receiving aperture and a trigger extension carried in the trigger extension-receiving aperture of the pivoting trigger release. This trigger extension may limit the pivotable travel of the pivoting trigger release to less then one hundred eighty degrees due to interference between the trigger extension and the web of the body.

The pivotable load support pivot point aperture mentioned above is, in a preferred embodiment, located more than half the length of the load support as measured from the linkage attachment point at one end of the load support. It further comprises a capture element-receiving surface formed integral with the pivotable load support at the end of the pivotable load support furthest away from the linkage attachment point.

The linkage rod, also mentioned above, further comprises a kink in the linkage rod, the kink located adjacent the pivoting trigger release when the pivoting trigger release is pivoted to a stored position arranged approximately inboard of the plane of the web of the body channel and above the trigger pivot point pin apertures in the walls of the body channel.

Further description of one embodiment of the invention, that detailing the bi-directional aspect of the trigger, follows in the next several paragraphs.

In this, generally preferred embodiment, there is a deadfall trap device with a bi-directional trigger assembly. The assembly is as described above and includes a pivoting trigger release, capable of rotating clockwise and counterclockwise, in contact with a releasable trigger element when the deadfall trap device is set. When the device is sprung with the pivoting trigger release moving clockwise the following occurs. The trigger assembly has a pivoting trigger release with a downwardly extending portion and an upwardly extending portion. The related releasable trigger element has a first adjacent surface and a second adjacent surface wherein the downwardly extending portion of the pivoting trigger release is in contact with the first adjacent surface of the releasable trigger element when the deadfall trap is set. When the deadfall trap is sprung, for instance when an animal pushes the trip stick downward, the pivoting trigger release is rotated clockwise relative to the position of the releasable trigger element resulting in the downwardly extending portion of the pivoting trigger release contacting the first adjacent surface of the of the releasable trigger element. This will urge the first contact surface of the pivoting trigger release to disengage from the second contact surface of the releasable trigger element.

Similarly, when the pivoting trigger release is rotated counter-clockwise the following happens. The device comprises the upwardly extending portion of the pivoting trigger release in contact with the second adjacent surface of the releasable trigger element when the deadfall trap is set whereby the deadfall trap will be sprung when the pivoting trigger release is rotated counterclockwise relative to the position of the releasable trigger element resulting in the upwardly extending portion of the pivoting trigger release contacting the second adjacent surface of the releasable trigger element and urging the first contact surface of the pivoting trigger release to disengage from the second contact surface of the releasable trigger element.

Both of the embodiments detailed above may comprise a body portion as previously discussed. The body portion is a channel having first and second spaced apart walls connected by a web. A trigger pivot point aperture extending on the same axis through both walls of the body and a load support pivot point aperture extending on the same axis through both walls of the body.

The pivoting trigger release has a trigger pivot point pin carried in the pivoting trigger release and extending through the trigger pivot aperture in each of both walls of the body portion of the deadfall trap device.

Also as described earlier in this specification the device will have load support pivot point apertures formed in the spaced apart walls of the body of the deadfall trap apparatus and a pivotable load support further comprising a load support pivot point pin pivotally carried in the load support pivot point apertures formed in the spaced apart walls of the body of the deadfall trap apparatus. There will be a linkage rod connecting the releasable trigger element to a linkage attachment point at one end of the pivotable load support.

A provision for a trip stick is also contemplated in the above embodiments. The pivoting trigger release has a trigger extension (or "trip stick") receiving aperture for the trip stick; and a trigger extension ("trip stick") carried in the trigger extension-receiving aperture of the pivoting trigger release.

As in the preferred embodiment of the invention there is a pivotable load support that includes a capture element-receiving surface formed integral with the pivotable load support at the end of the pivotable load support furthest away from the linkage attachment point.

While the invention is described herein in terms of preferred embodiments and generally associated methods, the inventor contemplates that alterations and permutations of the preferred embodiments and methods will become apparent to those skilled in the art upon a reading of the specification and a study of the drawings.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof-without limitation by other terms not present in the claim.

What is claimed is:

1. A deadfall trap apparatus for capturing an animal for survival, comprising:
    a body portion;
    the body portion comprising a channel having first and second spaced apart walls connected by a web;
    a trigger pivot point aperture, the trigger point aperture extending through both walls of the body portion;
    a load support pivot point aperture extending through both walls of the body portion;
    a pivoting trigger release;
    the pivoting trigger release further comprising a trigger pivot point pin pivotably carried in the trigger pivot point aperture on the spaced apart walls of the body portion;
    a releasable trigger element in contact with the pivoting trigger release when the deadfall trap apparatus is "set" and the releasable trigger element not in contact with the pivoting trigger release when the deadfall trap is "tripped";
    a pivotable load support having a length from one end of the pivotable load support to a second end of the pivotable load support, the pivotable load support having a load support pivot point aperture and a load support pivot point pin carried in the load support pivot point aperture;
    the pivotable load support pivot point pin pivotably carried in the pivotable load support pivot point apertures formed in the spaced apart walls of the body portion of the deadfall trap apparatus; and
    a linkage rod connecting the releasable trigger element to a linkage attachment point at one end of the pivotable load support.

2. The apparatus in accordance with claim 1 further comprising a first and a second slot formed in the web of the body portion, the first slot adjacent the trigger pivot point aperture in the walls of the body portion and the second slot adjacent the load support pivot point apertures in the walls of the body portion.

3. The apparatus in accordance with claim 2 wherein the pivoting trigger release may pivot on the trigger pivot point pin through the first slot in an arc of less than three hundred sixty degrees until the pivoting trigger release contacts the web of the body portion.

4. The apparatus in accordance with claim 3 further comprising the pivoting trigger release having a trigger extension receiving aperture; and
    a trigger extension carried in the trigger extension receiving aperture of the pivoting trigger release.

5. The apparatus in accordance with claim 4 further comprising the trigger extension limits the pivoting trigger release to less than one hundred eighty degrees of pivoting travel due to interference between the trigger extension and the web of the body portion.

6. The apparatus in accordance with claim 2 wherein the pivotable load support may pivot on the load support pivot pin through the second slot in an arc of less than three hundred sixty degrees until the pivotable load support contacts the web of the body portion.

7. The apparatus in accordance with claim 1 further comprising the pivotable load support pivot point aperture is located more than half a length of the load support as measured from the linkage attachment point at the one end of the load support.

8. The apparatus in accordance with claim 7 wherein the pivotable load support further comprises a capture element receiving surface formed integral with the pivotable load support, the capture element receiving surface located away from the linkage attachment point.

9. The apparatus in accordance with claim 1 wherein the linkage rod further comprises a kink in the linkage rod, the kink located adjacent the pivoting trigger release when the pivoting trigger release is pivoted to a stored position.

10. A deadfall trap device having a bi-directional trigger assembly including a pivoting trigger release, capable of rotating clockwise and counterclockwise, in contact with a releasable trigger element when the deadfall trap device is "set," the trigger assembly comprising:
   the pivoting trigger release having a downwardly extending portion and an upwardly extending portion; and
   the releasable trigger element having a first adjacent surface and a second adjacent surface wherein the downwardly extending portion of the pivoting trigger release is in contact with the first adjacent surface of the releasable trigger element when the deadfall trap is set whereby the deadfall trap will be "sprung" when the pivoting trigger release is rotated clockwise resulting in the downwardly extending portion of the pivoting trigger release contacting the first adjacent surface of the of the releasable trigger element and urging the first adjacent surface of the pivoting trigger release to disengage from the second adjacent surface of the releasable trigger element;
   the deadfall trap device further comprising:
      a body portion;
      the body portion comprising a channel having first and second spaced apart walls connected by a web, a trigger pivot point aperture extending through the first and second spaced apart walls of the body portion and a load support pivot point aperture extending through the first and second spaced apart walls of the body portion;
   wherein the pivoting trigger release further comprises a trigger pivot point pin carried in the pivoting trigger release and extending through the trigger pivot aperture in each of the first and second spaced apart walls of the body portion of the deadfall trap device;
   load support pivot point apertures formed in the spaced apart walls of the body portion of the deadfall trap apparatus;
   a pivotable load support;
   the pivotable load support further comprising a load support pivot point pin pivotably carried in the load support pivot point apertures formed in the spaced apart walls of the body portion of the deadfall trap apparatus; and
   a linkage rod connecting the releasable trigger element to a linkage attachment point at one end of the pivotable load support.

11. The device in accordance with claim 10 further comprising the upwardly extending portion of the pivoting trigger release is in contact with the second adjacent surface of the releasable trigger element when the deadfall trap is set whereby the deadfall trap will be "sprung" when the pivoting trigger release is rotated counterclockwise resulting in the upwardly extending portion of the pivoting trigger release contacting the second adjacent surface of the releasable trigger element and urging the first contact surface of the pivoting trigger release to disengage from the second contact surface of the releasable trigger element.

12. The device in accordance with claim 10 further comprising:
   the pivoting trigger release having a trigger extension receiving aperture; and
   a trigger extension carried in the trigger extension receiving aperture of the pivoting trigger release.

13. The in accordance with claim 10 wherein the pivotable load support further comprises a capture element receiving surface formed integral with the pivotable load support.

* * * * *